United States Patent
Kim et al.

(10) Patent No.: US 11,205,433 B2
(45) Date of Patent: Dec. 21, 2021

(54) METHOD AND APPARATUS FOR ACTIVATING SPEECH RECOGNITION

(71) Applicant: QUALCOMM Incorporated, San Diego, CA (US)

(72) Inventors: Byeonggeun Kim, Seoul (KR); Young Mo Kang, Redwood City, CA (US); Sungrack Yun, Seongnam-si (KR); Kyu Woong Hwang, Daejeon (KR); Hye Jin Jang, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 16/547,263

(22) Filed: Aug. 21, 2019

(65) Prior Publication Data
US 2021/0056974 A1 Feb. 25, 2021

(51) Int. Cl.
| | | |
|---|---|---|
| G10L 25/00 | (2013.01) | |
| G10L 15/00 | (2013.01) | |
| G10L 17/00 | (2013.01) | |
| G10L 15/22 | (2006.01) | |

(52) U.S. Cl.
CPC .............. *G10L 17/00* (2013.01); *G10L 15/00* (2013.01); *G10L 15/22* (2013.01); *G10L 2015/223* (2013.01)

(58) Field of Classification Search
CPC .......... G06F 1/3231; G06F 3/16; G06F 3/167; G10L 15/00; G10L 15/22; G10L 15/28; G10L 17/00
USPC .......................... 704/200, 231, 243, 246, 247
See application file for complete search history.

(56) References Cited

U.S. PATENT DOCUMENTS

| | | | | |
|---|---|---|---|---|
| 10,923,128 | B2 * | 2/2021 | Lesso | G10L 15/26 |
| 2005/0182631 | A1 * | 8/2005 | Lee | G10L 15/22 |
| | | | | 704/275 |
| 2008/0071546 | A1 * | 3/2008 | Beiermeister | G10L 15/26 |
| | | | | 704/273 |
| 2013/0132091 | A1 * | 5/2013 | Skerpac | G06F 21/32 |
| | | | | 704/273 |
| 2015/0039303 | A1 * | 2/2015 | Lesso | G10L 15/20 |
| | | | | 704/233 |
| 2015/0081295 | A1 * | 3/2015 | Yun | G06F 21/32 |
| | | | | 704/236 |
| 2015/0302856 | A1 * | 10/2015 | Kim | G10L 25/48 |
| | | | | 704/273 |
| 2016/0210451 | A1 * | 7/2016 | Hwang | G06K 9/00617 |
| 2016/0284350 | A1 * | 9/2016 | Yun | G06F 3/167 |

(Continued)

FOREIGN PATENT DOCUMENTS

GB    2515527 A * 12/2014 ............. G10L 17/24

*Primary Examiner* — Khai N. Nguyen
(74) *Attorney, Agent, or Firm* — Qualcomm Incorporated

(57) ABSTRACT

A device to process an audio signal representing input sound includes a user voice verifier configured to generate a first indication based on whether the audio signal represents a user's voice. The device includes a speaking target detector configured to generate a second indication based on whether the audio signal represents at least one of a command or a question. The device includes an activation signal unit configured to selectively generate an activation signal based on the first indication and the second indication. The device also includes an automatic speech recognition engine configured to be activated, responsive to the activation signal, to process the audio signal.

30 Claims, 5 Drawing Sheets

(56) References Cited

U.S. PATENT DOCUMENTS

2017/0154176 A1* 6/2017 Yun .................. G06F 3/167
2021/0056974 A1* 2/2021 Kim .................. G10L 15/22

* cited by examiner

METHOD AND APPARATUS FOR ACTIVATING SPEECH RECOGNITION

I. FIELD

The present disclosure is generally related to speech recognition.

II. DESCRIPTION OF RELATED ART

Speech recognition is conventionally used to enable an electronic device to interpret spoken questions or commands from users. Such spoken questions or commands can be identified by analyzing an audio signal, such as a microphone input, at an automatic speech recognition (ASR) engine that generates a textual output of the spoken questions or commands. An "always-on" ASR system enables the electronic device to continually scan audio input to detect user commands or questions in the audio input. However, continual operation of the ASR system results in relatively high power consumption, which reduces battery life when implemented in a mobile device.

III. SUMMARY

According to one implementation of the present disclosure, a device to process an audio signal representing input sound includes a user voice verifier configured to generate a first indication based on whether the audio signal represents a user's voice. The device includes a speaking target detector configured to generate a second indication based on whether the audio signal represents at least one of a command or a question. The device includes an activation signal unit configured to selectively generate an activation signal based on the first indication and the second indication. The device also includes an automatic speech recognition engine configured to be activated, responsive to the activation signal, to process the audio signal.

According to another implementation of the present disclosure, a method of processing an audio signal representing input sound includes generating, at an electronic device, a first indication based on whether the audio signal represents a user's voice. The method includes generating, at the electronic device, a second indication based on whether the audio signal represents at least one of a command or a question. The method also includes selectively generating, at the electronic device, an activation signal based on the first indication and the second indication to selectively activate an automatic speech recognition engine to process the audio signal.

According to another implementation of the present disclosure, a non-transitory computer-readable medium includes instructions that, when executed by one or more processors of a device, cause the one or more processors to perform operations for processing an audio signal representing input sound. The operations include generating, at the one or more processors, a first indication based on whether the audio signal represents a user's voice. The operations include generating, at the one or more processors, a second indication based on whether the audio signal represents at least one of a command or a question. The operations also include selectively generating, at the one or more processors, an activation signal based on the first indication and the second indication to selectively activate an automatic speech recognition engine to process the audio signal.

According to another implementation of the present disclosure, an apparatus to process an audio signal representing input sound includes means for generating a first indication based on whether the audio signal represents a user's voice. The apparatus includes means for generating a second indication based on whether the audio signal represents at least one of a command or a question. The apparatus includes means for selectively generating an activation signal based on the first indication and the second indication. The apparatus includes means for performing automatic speech recognition on the audio signal, the means for performing automatic speech recognition configured to be activated responsive to the activation signal.

IV. BRIEF DESCRIPTION OF THE DRAWINGS

V. DETAILED DESCRIPTION

Figure 1:
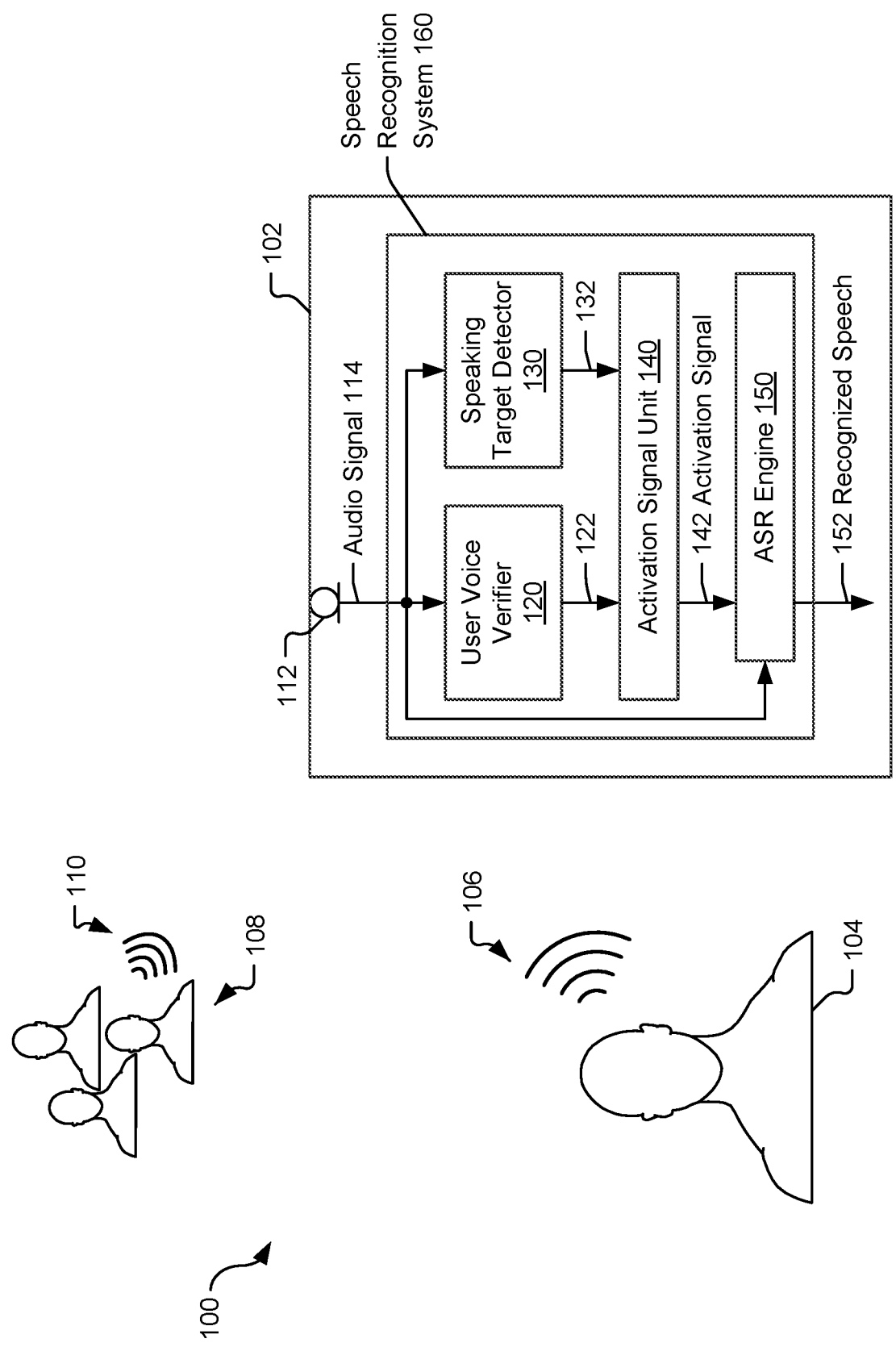
FIG. 1 is a diagram of a particular illustrative implementation of a system including a device operable to selectively activate speech recognition.

Devices and methods to selectively activate an ASR engine to reduce power consumption are disclosed. Because an always-on ASR system that continually scans audio input to detect user commands or questions in the audio input results in relatively high power consumption, battery life is reduced when the ASR engine is implemented in a mobile device. In an attempt to reduce power consumption, some systems may use a reduced-capacity speech recognition processor that consumes less power than a full-power ASR engine to perform keyword detection on the audio input. When a keyword is detected, the full-power ASR engine can be activated to process the audio input. Although such a system can operate with reduced power consumption as compared to an always-on ASR engine, power consumption savings are limited by the rate of "false activations" of the ASR engine. For example, the keyword may be detected as part of ordinary speech or background noise and may not represent a question or command from a user of the device.

As described herein, occurrences of false activations are reduced by using a pre-stage that includes a user voice verifier and a speaking target detector. The user voice verifier checks whether an input voice matches the voice of a registered user. Users can enroll their voices, and the ASR system can learn the users' voices to generate a model representing each user's voice. The speaking target detector checks whether an input tone is a command tone or an asking tone. For example, when a person speaks, the pattern in which the tone changes differs according to the speaker's intention. The speaking target detector detects such tone changing patterns to determine whether an utterance is a command or question to be directed to the ASR system, as opposed to, for example, a conversational statement or exclamation, which should not to be directed to the ASR system.

In response to an input sound being identified as matching a registered user's voice and also being a question or command, a full-power ASR engine can be activated to process the input sound, such as to verify the speaker identification and to interpret the input speech to generate a text output. Because the voice and tone models used by the pre-stage are less complex as compared to the speech models used by the ASR engine, processing input sound at the pre-stage uses significantly less power than processing the input sound at the ASR engine, and may also use less power than performing keyword detection to activate an ASR engine. In addition, because the ASR engine remains deactivated until an input sound is identified as a command or question from a registered user, a rate of false activations is reduced as compared to systems that use keyword detection to activate an ASR engine. As a result, processing resources are conserved and overall power consumption is reduced.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearly wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wireless modems, laptop computers, personal computers, etc.

FIG. 1 depicts a system 100 that includes a device 102 that is configured to receive an input sound, such as an utterance 106 (i.e., speech, such as a question or a command) from a user 104, background noise 110 from one or more noise sources 108 (e.g., a background conversation between multiple people), or a combination thereof, and to determine whether to activate an ASR engine 150 based on whether the input sound matches a registered user's voice and is identified as a question or command. The device 102 includes one or more microphones, represented as a microphone 112, and a speech recognition system 160. The speech recognition system 160 includes a user voice verifier 120, a speaking target detector 130, an activation signal unit 140, and the ASR engine 150. In some implementations, the device 102 can include a wireless speaker and voice command device with an integrated assistant application (e.g., a "smart speaker" device), a portable communication device (e.g., a "smart phone"), or a vehicle system (e.g., a speech interface for an automobile entertainment system, navigation system, or self-driving control system), as illustrative, non-limiting examples.

The microphone 112 is configured to generate an audio signal 114 responsive to the received sound, including the utterance 106 and the background noise 110. The audio signal 114 is provided to the user voice verifier 120, the speaking target detector 130, and the ASR engine 150 in the speech recognition system 160.

The user voice verifier 120 is configured to process the audio signal 114 to determine whether the audio signal 114 is indicative of a particular speaker. For example, the user voice verifier 120 can be configured as a deep neural network that is trained to distinguish each registered user of the device 102 from the other registered users (and from people that are not registered users) based on voice and/or speech characteristics and independent of (e.g., without having determined) the content of the speech. To illustrate, the user voice verifier 120 can include a trained text-independent speaker verification system that performs a same-or-different speaker decision using i-vectors, embeddings extracted from a feed-forward deep neural network, or both, to determine if a portion of the audio signal 114 is from one of the registered users of the device 102, as an illustrative, non-limiting example. The user voice verifier 120 is configured to generate a first indication 122 based on whether the audio signal 114 represents a registered user's voice. For example, the first indication 122 can be a binary value, such as a "1" value indicating that the audio signal 114 represents a registered user's voice or a "0" value indicating that the audio signal 114 does not represent a registered user's voice. As another example, the first indication 122 can be a multi-bit digital value or an analog value (e.g., a voltage level or current level) that represents a likelihood or probability that the audio signal 114 represents a registered user's voice.

The speaking target detector 130 is configured to process the audio signal 114 and to generate a second indication 132 based on whether the audio signal 114 represents at least one of a command or a question. For example, the speaking target detector 130 can be configured as a deep neural network that is trained to identify whether the audio signal 114 represents speech that exhibits tone change patterns that represent commands or tone change patterns that represent questions. In an example, the second indication 132 can be a binary value, such as a "1" value indicating that the audio signal 114 represents a command or a question, or a "0" value indicating that the audio signal 114 does not represent a command and does not represent a question. As another example, the second indication 132 can be a multi-bit digital value or an analog value that represents a likelihood or probability that the audio signal 114 represents a command or question.

The activation signal unit 140 is configured to selectively generate an activation signal 142 based on the first indication 122 and the second indication 132. For example, the activation signal unit 140 is configured to perform one or more logical or arithmetic operations using the first indication 122 and the second indication 132 and to selectively generate the activation signal 142 based on a result of the one or more operations. To illustrate, in some implementations the activation signal unit 140 is configured to select to generate the activation signal 142 (e.g., output a "1" value) responsive to the first indication 122 indicating that the audio signal 114 represents a registered user's voice and the second indication 132 indicating that the audio signal 114 indicates a command or a question, and is further configured to select to not generate the activation signal 142 (e.g., output a "0" value instead of a "1" value) responsive to the first indication 122 indicating that the audio signal 114 does not represent a verified user or the second indication 132 indicating that the audio signal 114 does not indicate a command or a question. In an example implementation in which each of the first indication 122 and the second indication 132 has a binary value, the activation signal unit 140 is configured to perform a logical AND operation to generate an output having a "1" value as the activation signal 142 when the first indication 122 and the second indication 132 each have a "1" value, and to generate an output having a "0" value as a non-activation signal when either of the first indication 122 and the second indication 132 has a "0" value. Another example of components that can be implemented in the activation signal unit 140 is described in FIG. 3.

The ASR engine 150 is configured to be activated, responsive to the activation signal 142, to process the audio signal 114. The ASR engine 150 is configured to be deactivated responsive to termination of the activation signal 142. In an illustrative example, a specific bit of a control register represents the presence or absence of the activation signal 142 and a control circuit within or coupled to the ASR engine 150 is configured to read the specific bit. A "1" value of the bit indicates the activation signal 142 and causes the ASR engine 150 to activate, and a "0" value of the bit indicates absence of the activation signal 142 and that the ASR engine 150 can de-activate upon completion of processing a current portion of the audio signal 114. In other implementations, the activation signal 142 is instead implemented as a digital or analog signal on a bus or a control line, an interrupt flag at an interrupt controller, or an optical or mechanical signal, as illustrative, non-limiting examples.

When activated, the ASR engine 150 is configured to process one or more portions (e.g., frames) of the audio signal 114 that include the utterance 106. For example, the speech recognition system 160 can buffer a series of frames of the audio signal 114 as the audio signal 114 is being processed by the user voice verifier 120 and the speaking target detector 130 so that, upon the activation signal 142 being generated, the ASR engine 150 can process the buffered series of frames and generate an output indicative of the user's speech. The ASR engine 150 can provide recognized speech 152 as a text output of the content of the utterance 106 to another component of the device 102, such as a "virtual assistant" application or other application as described with reference to FIG. 2, to initiate an action based on the utterance 106.

When deactivated, the ASR engine 150 does not process the audio signal 114 and consumes less power than when activated. For example, deactivation of the ASR engine 150 can include gating an input buffer to the ASR engine 150 to prevent the audio signal 114 from being input to the ASR engine 150, gating a clock signal to prevent circuit switching within the ASR engine 150, or both, to reduce dynamic power consumption. As another example, deactivation of the ASR engine 150 can include reducing a power supply to the ASR engine 150 to reduce static power consumption without losing the state of the circuit elements, removing power from at least a portion of the ASR engine 150, or a combination thereof.

In some implementations, the user voice verifier 120, the speaking target detector 130, the activation signal unit 140, the ASR engine 150, or any combination thereof, are implemented using dedicated circuitry or hardware. In some implementations, the user voice verifier 120, the speaking target detector 130, the activation signal unit 140, the ASR engine 150, or any combination thereof, are implemented via execution of firmware or software. To illustrate, the device 102 can include a memory configured to store instructions and one or more processors configured to execute the instructions to implement the user voice verifier 120, the speaking target detector 130, the activation signal unit 140, and the ASR engine 150, such as described further with reference to FIG. 5.

Because the processing operations (e.g., voice models) of the user voice verifier 120 and the speaking target detector 130 are less complex as compared to the models used by the ASR engine 150, always-on processing of the audio signal 114 at the user voice verifier 120 and the speaking target detector 130 uses significantly less power than processing the audio signal 114 at the ASR engine 150. In addition, because the ASR engine 150 is not activated until an input sound is identified as a command or question from a registered user, a rate of false activations is reduced as compared to systems that use keyword detection to activate an ASR engine. As a result, processing resources are conserved and overall power consumption is reduced.

Figure 2:
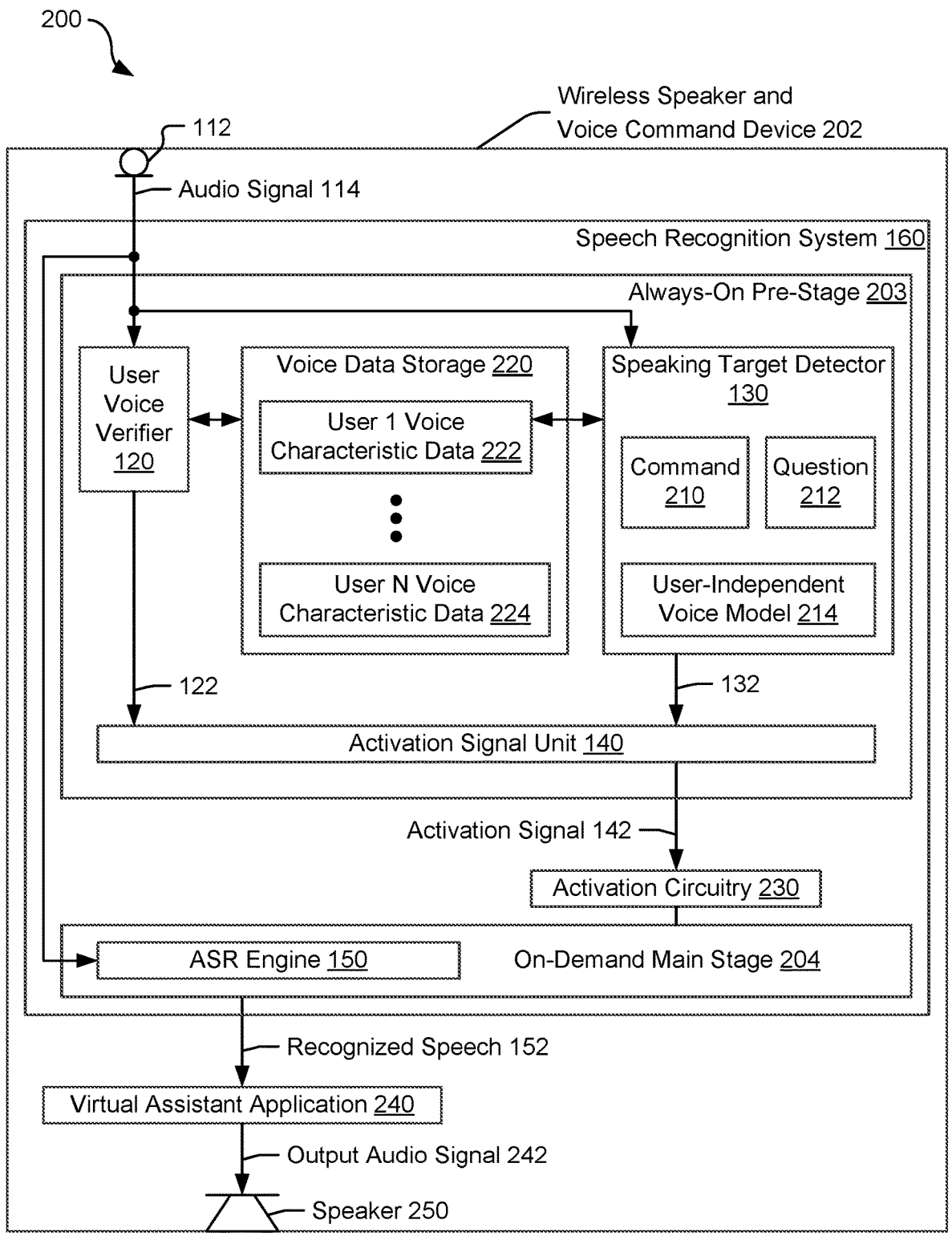
FIG. 2 is a diagram of a particular implementation of the device of FIG. 1.

FIG. 2 depicts an example 200 of the device 102 of FIG. 1 implemented as a wireless speaker and voice command device 202. The speech recognition system 160 includes an always-on pre-stage 203 and an on-demand main stage 204. Activation circuitry 230 is responsive to the activation signal 142 to selectively activate one or more components of the on-demand main stage 204, such as the ASR engine 150.

The always-on pre-stage 203 includes the user voice verifier 120, the speaking target detector 130, the activation signal unit 140, and a voice data storage 220. The voice data storage 220 is configured to store voice characteristic data of one or more registered users. For example, the voice data storage 220 includes first voice characteristic data 222 of a first registered user and one or more additional sets of voice characteristic data, including Nth voice characteristic data 224 of an Nth registered user, where N is an integer greater than one. The user voice verifier 120 is configured to access the voice characteristic data 222-224 to determine whether the audio signal 114 represents the voice of one of the registered users.

The speaking target detector 130, in some implementations, is configured to access the voice data storage 220 and the voice characteristic data 222-224 to determine whether the audio signal 114 represents a command 210 or question 212 of one of the registered users. For example, the speech recognition system 160 may capture and characterize an intonation pattern of each of the registered users when the user is speaking a command or question and may store the resulting characterization data as the user voice characteristic data 222-224. The speaking target detector 130 may be configured to compare characteristics of the audio signal 114 to "command" intonation characteristics and "question" intonation characteristics of each of the registered users to determine whether the audio signal 114 represents a command or a question of that particular user. Generally, a command may be spoken by a user with a particular intonation that makes the utterance recognizable as a command without interpreting the user's speech. As another example, an utterance may be identified as a question based on an inflection at the end of the utterance, without interpreting the user's speech. Thus, the command 210 and the question 212 do not represent particular, specific commands and questions (e.g., as in key word detection), but instead represent tonal voice characteristics indicative of an utterance of a command or utterance of a question.

Although the speaking target detector 130 is described as accessing the voice characteristic data 222-224, in other implementations the speaking target detector 130 is configured to determine whether the audio signal 114 represents a command or a question based on a user-independent voice model 214. For example, prior to registration of any users, the speaking target detector 130 may be configured to use the user-independent voice model 214 to identify whether an utterance represents a command or question.

The activation circuitry 230 is configured to selectively activate one or more components of the on-demand main stage 204, such as the ASR engine 150. For example, the activation circuitry 230 may include or be coupled to power management circuitry, clock circuitry, head switch or foot switch circuitry, buffer control circuitry, or any combination thereof. The activation circuitry 230 may be configured to initiate powering-on of the on-demand main stage 204, such as by selectively applying or raising a voltage of a power supply of the on-demand main stage 204. As another example, the activation circuitry 230 may be configured to selectively gate or un-gate a clock signal to the on-demand main stage 204, such as to prevent circuit operation without removing a power supply. Although the on-demand main stage 204 is illustrated as including the ASR engine 150, other implementations of the on-demand main stage 204 may include additional components, such as a speaker verifier to verify, with greater accuracy than the user voice verifier 120, that the audio signal 114 represents the voice of one of the registered users.

The recognized speech 152 output by the ASR engine 150 is provided to a virtual assistant application 240. For example, the virtual assistant application 240 may be implemented by one or more processors executing instructions, such as described in further detail with reference to FIG. 5. The virtual assistant application 240 may be configured to perform one or more search queries, such as via wireless connection to an internet gateway, search server, or other resource, searching a local storage of the wireless speaker and voice command device 202, or a combination thereof.

To illustrate, the audio signal 114 may represent the spoken question of a registered user, "what the weather like today?" The virtual assistant application 240 may generate a query to access an Internet-based weather service to obtain a weather forecast for a geographic region in which the wireless speaker and voice command device 202 is located. The virtual assistant application 240 is configured to generate an output, such as an output audio signal 242 that causes a speaker 250 to generate an auditory output, such as in a voice interface implementation. In other implementations, the virtual assistant application 240 may generate another mode of output, such as a visual output signal that may be displayed by a screen or display that is integrated in the device 202 or coupled to the device 202.

Figure 3:
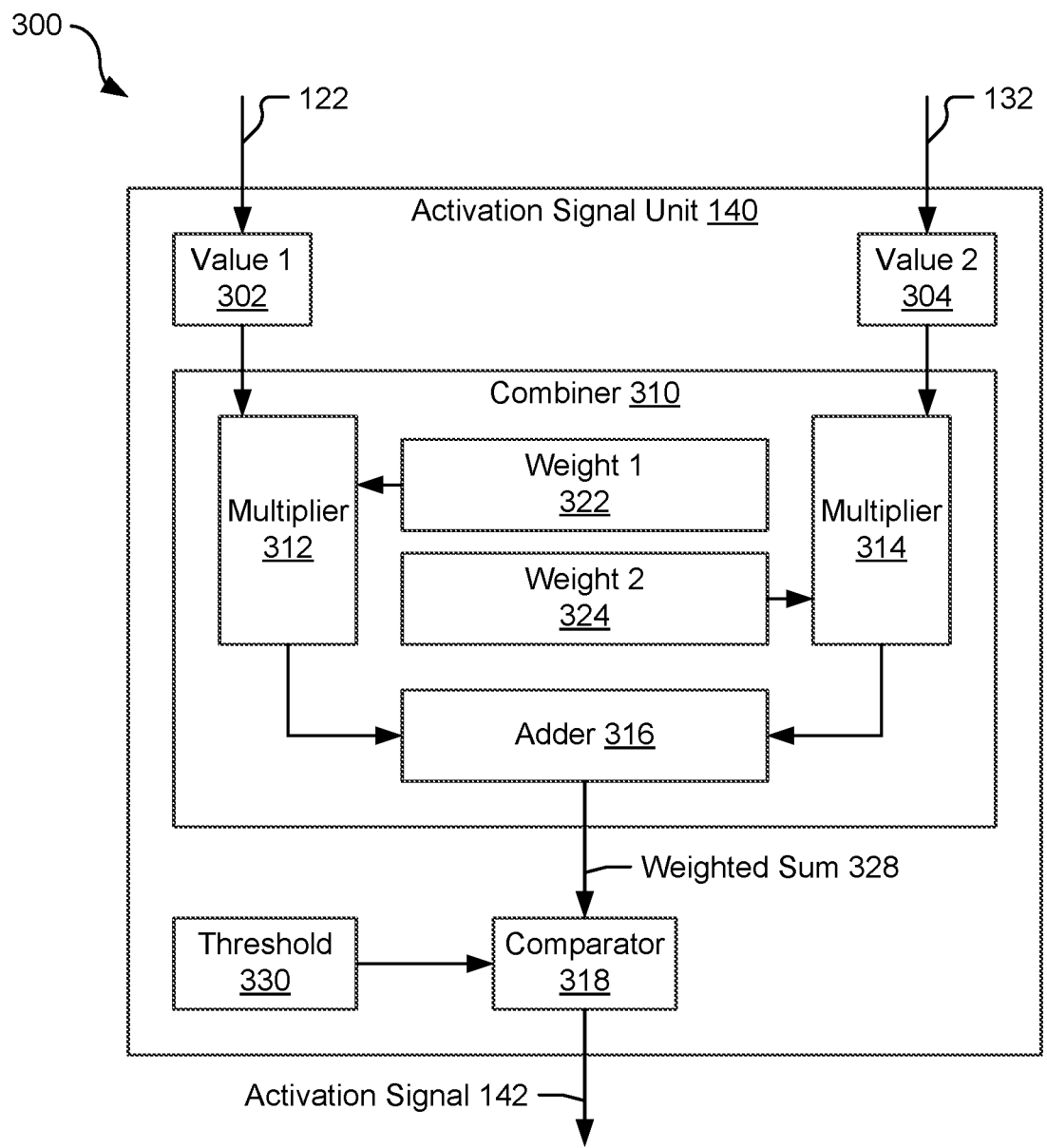
FIG. 3 is a diagram of a particular implementation of components that may be incorporated in the device of FIG. 1.

FIG. 3 depicts an implementation 300 of the activation signal unit 140. As illustrated in FIG. 3, the first indication 122 has a first value 302 that indicates a first likelihood that the audio signal 114 represents a user's voice. The second indication 132 has a second value 304 that indicates a second likelihood that the audio signal 114 represents at least one of a command or question. The activation signal unit 140 includes a combiner 310 that is configured to generate a combined value that is output to a comparator 318. The comparator 318 compares the combined value to a threshold 330. The activation signal 142 is generated in response to the combined value satisfying (e.g., equaling or exceeding) the threshold 330, and is not generated in response the combined signal not satisfying the threshold 330.

The combiner 310 is illustrated as being configured to generate a weighted sum 328 of the first value 302 and the second value 304. To illustrate, the combiner 310 includes a first multiplier 312 configured to determine a multiplicative product of the first value 302 and a first weight 322. The combiner 310 includes a second multiplier 314 that is configured to generate a multiplicative product of the second value 304 and the second weight 324. The multiplicative products of the first multiplier 312 and the second multiplier 314 are received at inputs to an adder 316 that is configured to add the multiplicative products to generate the weighted sum 328. The weighted sum 328 may be expressed as a total confidence score $c_{total} = w_1 c_{Voice} + w_2 c_{Tone}$, where $w_1$ represents the first weight 322, $c_{Voice}$ represents the first value 302, $w_2$ represents the second weight 324, and $c_{Tone}$ represents the second value 304. An aspect of using the weighted sum 328 is that a reduced likelihood indicated by one of the values 302, 304 can be offset for by an increased likelihood indicated by the other of the values 302, 304, reducing a possibility of a "false negative" in which the activation signal unit 140 fails generate the activation signal 142 in response to a command or question of a registered user.

Although the combiner 310 is illustrated as configured to generate the weighted sum 328, in other implementations the combiner 310 is configured to generate other outputs based on the first value 302 and the second value 304. For example, the combiner 310 can compare the first value 302 to a first threshold and the second value 304 to a second threshold, and generate an output based on combining (e.g., adding) the comparison results. As another example, the combiner 310 can add the first value 302 to the second value 304 to generate an unweighted sum that is compared to the threshold 330.

In some implementations, values of weights and thresholds used by the device (e.g., the weights 322, 324 and the threshold 330) can be set by a manufacturer or provider of the device 102. In some implementations, the device 102 is configured to adjust one or more such values during the life of the device 102 based on detected false negatives, false activations, or a combination thereof, associated with the speech recognition system 160. For example, a history of false activations can be maintained by the device 102 so that the characteristics of the audio signal 114 that triggered the false activations can be periodically used to automatically adjust one or more weights or thresholds to reduce a likelihood of future false activations.

Although particular values are included in the descriptions of FIGS. 1-3, such as a "1" value to indicate the activation signal 142, it will be understood that such values are provided for explanatory purposes only and are not limitations. To illustrate, in some implementations the activation signal 142 is indicated by a "0" value. As another example, in some implementations a "1" value of the first indication 122 indicates a high likelihood that the audio signal 114 matches a registered user's voice, while in other implementations a "0" value of the first indication 122 indicates the high likelihood that the audio signal 114 matches a registered user's voice. Similarly, in some implementations a "1" value of the second indication 132 indicates a high likelihood that the audio signal 114 represents a question or command, while in other implementations a "0" value of the second indication 132 indicates the high likelihood that the audio signal 114 represents a question or command.

Although FIGS. 1-3 describe determining the activation signal 142 based on the first indication 122 from the user voice verifier 120 and the second indication 132 from the speaking target detector 130, and the user voice verifier 120 and the speaking target detector 130 operate in parallel (e.g., independently and at least partially overlapping in time), in other implementations the user voice verifier 120 and the speaking target detector 130 are operated serially instead of in parallel. For example, the speaking target detector 130 can remain deactivated until the user voice verifier 120 has determined that the audio signal 114 corresponds to the voice of a registered user. As another example, the user voice verifier 120 can remain deactivated until the speaking target detector 130 has determined that the audio signal 114 corresponds to a command or question. In such implementations, although latency may be increased due to serial rather than parallel processing, overall power is reduced due to having components remaining deactivated until other components approve the audio signal 114 for further processing.

Although FIGS. 1-3 describe determining the activation signal 142 based on the first indication 122 from the user voice verifier 120 and the second indication 132 from the speaking target detector 130, in other implementations one of the user voice verifier 120 and the speaking target detector 130 are omitted or deactivated. For example, the speaking target detector 130 can be deactivated (or omitted), and the activation signal 142 can be generated based on the first indication 122. As another example, the user voice verifier 120 can be deactivated (or omitted), and the activation signal 142 can be generated based on the second indication 132. Omitting or deactivating one of the user voice verifier 120 and the speaking target detector 130 reduces the power consumption of the always-on portion of the speech recognition system 160, but may result in a higher rate of false activations.

Although FIGS. 1-3 describe determining the activation signal 142 based on the first indication 122 from the user voice verifier 120 and the second indication 132 from the speaking target detector 130, in other implementations the activation signal 142 can be generated based on one or more additional signals. For example, a keyword detector can be used to at least partially determine whether the audio signal 114 represents an activation keyword. Adding additional computation units to generate additional indication signals may reduce a rate of false activations while increasing power consumption of the always-on portion of the speech recognition system 160.

Figure 4:
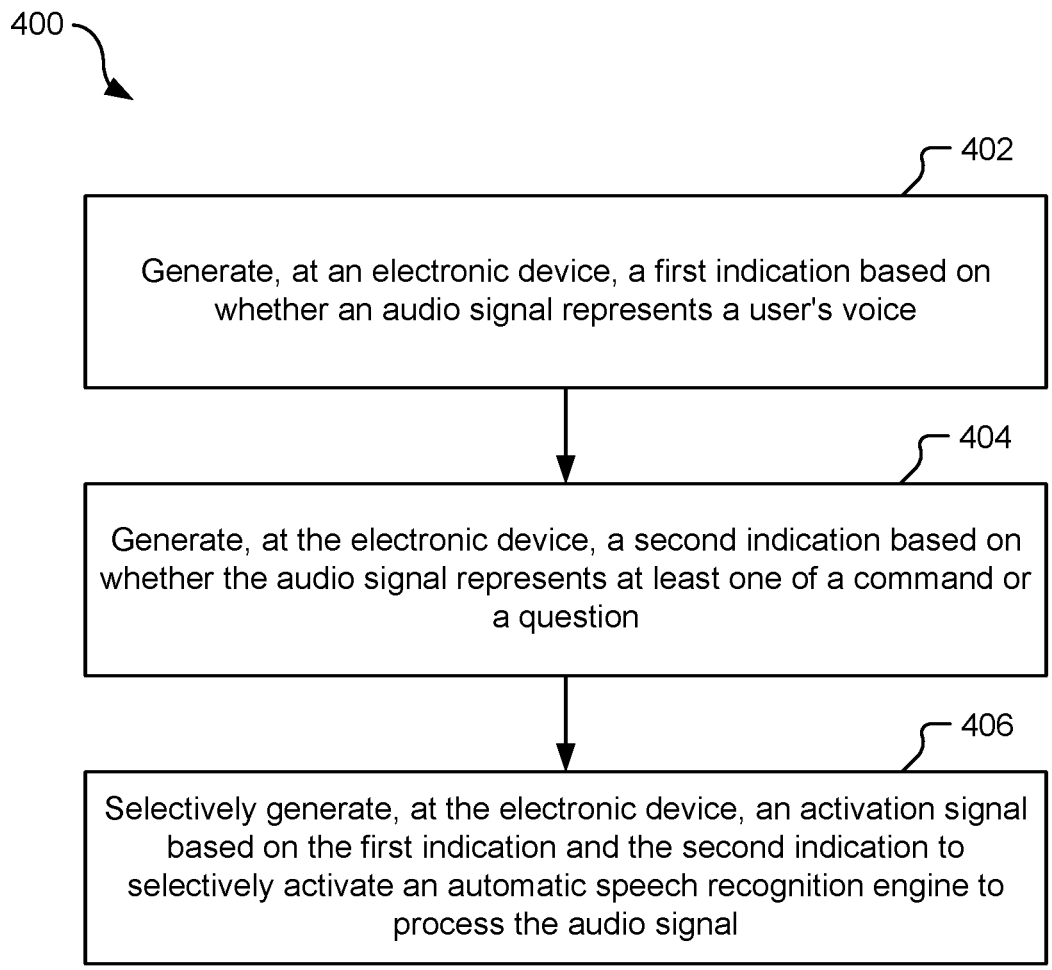
FIG. 4 is diagram of a particular implementation of a method of processing an audio signal representing input sound that may be performed by the device of FIG. 1.

Referring to FIG. 4, a particular implementation of a method 400 of processing an audio signal representing input sound is depicted that may be performed by the device 102 of FIG. 1.

The method 400 includes generating, at an electronic device, a first indication based on whether an audio signal represents a user's voice, at 402. For example, the user voice verifier 120 generates the first indication 122. The method 400 also includes generating, at the electronic device, a second indication based on whether the audio signal represents at least one of a command or a question, at 404. For example, the speaking target detector 130 generates the second indication 132.

The method 400 also includes selectively generating, at the electronic device, an activation signal based on the first indication and the second indication to selectively activate an automatic speech recognition engine to process the audio signal, at 406. For example, the activation signal unit 140 selectively generates the activation signal 142 based on the first indication 122 and the second indication 132. To illustrate, in an example, selectively generating the activation signal 142 includes selecting to generate the activation signal 142 responsive to the first indication 122 indicating that the audio signal 114 represents a registered user's voice and the second indication 132 indicating that the audio signal 114 indicates a command or a question. In another example, selectively generating the activation signal 142 includes selecting to not generate the activation signal 142 responsive to the first indication 122 indicating that the audio signal 114 does not represent a registered user's voice or the second indication 132 not indicating that the audio signal 114 indicates a command or a question.

In some implementations, the first indication, the second indication, and the activation signal are generated at an always-on pre-stage of a speech recognition system, such as the always-on pre-stage 203 of FIG. 2, and the automatic speech recognition engine is included in an on-demand main stage of the speech recognition system, such as the on-demand main stage 204 of FIG. 2. In some implementations, the method 400 includes accessing voice characteristic data, such as the voice characteristic data 222-224 of FIG. 2, to determine whether the audio signal represents the voice of a registered user and to determine whether the audio signal represents a command or question of a registered user. In some implementations, the method 400 includes determining whether the audio signal represents a command or question based on a user-independent voice model, such the user-independent voice model 214 of FIG. 2.

In some implementations, the first indication has a first value that indicates a first likelihood that the audio signal represents a user's voice and the second indication has a second value that indicates a second likelihood that the audio signal represents at least one of a command or a question. In an illustrative example, the activation signal is generated based on whether a weighted sum of the first value and the second value satisfies a threshold, such as described with reference to the combiner 310 and the comparator 318 of FIG. 3. In other implementations, the first indication, the second indication, or both, have a binary value (e.g., 1 or 0) rather than a multi-bit value that represents a probability or likelihood. In such implementations, the activation signal can be determined based on a logical combination of the first indication and the second indication, such as an AND operation or an OR operation.

By selectively generating the activation signal based on the first indication and the second indication, the method 400 enables always-on speech detection that selectively activates the automatic speech recognition engine when a command or question of a registered user is detected. As a result, power consumption is reduced as compared to speech recognition systems in which a speech recognition engine is always activated. Further, by generating the activation signal based on whether the input audio signal is a command or a question and corresponds to a registered user, a likelihood of false activations of the automatic speech recognition engine can be reduced as compared to systems in which activation of the automatic speech recognition engine is based on performing keyword detection.

The method 400 of FIG. 4 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 400 of FIG. 4 may be performed by a processor that executes instructions, such as described with reference to FIG. 5.

Figure 5:
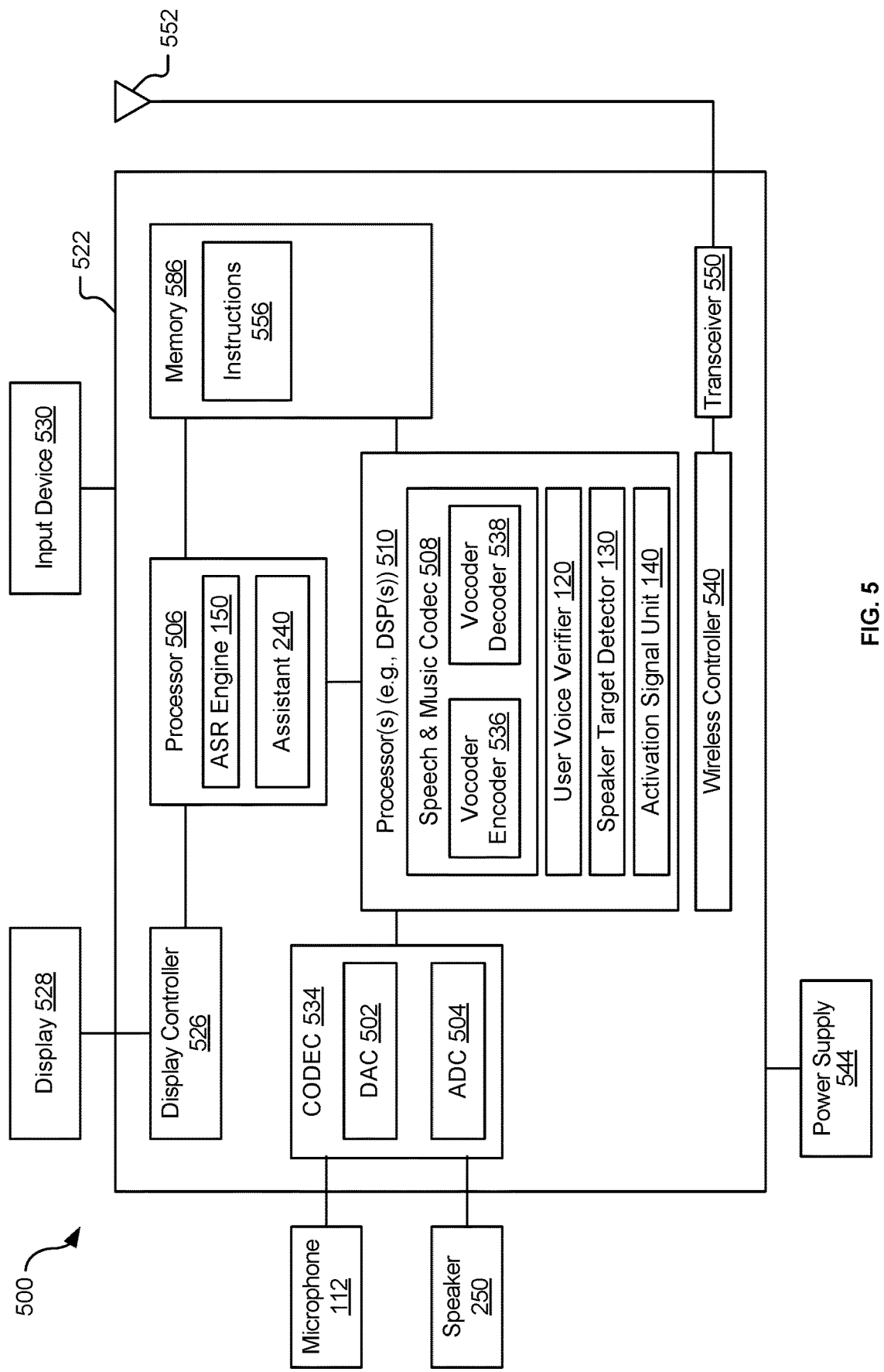
FIG. 5 is a block diagram of a particular illustrative example of a device that is operable to selectively activate speech recognition.

Referring to FIG. 5, a block diagram of a particular illustrative implementation of a device is depicted and generally designated 500. In various implementations, the device 500 may have more or fewer components than illustrated in FIG. 5. In an illustrative implementation, the device 500 may correspond to the device 102. In an illustrative implementation, the device 500 may perform one or more operations described with reference to FIGS. 1-4.

In a particular implementation, the device 500 includes a processor 506 (e.g., a central processing unit (CPU)). The device 500 may include one or more additional processors 510 (e.g., one or more DSPs). The processors 510 may include a speech and music coder-decoder (CODEC) 508, the user voice verifier 120, the speaking target detector 130, and the activation signal unit 140. The speech and music codec 508 may include a voice coder ("vocoder") encoder 536, a vocoder decoder 538, or both.

The device 500 may include a memory 586 and a CODEC 534. The memory 586 may include instructions 556, that are executable by the one or more additional processors 510 (or the processor 506) to implement the functionality described with reference to the user voice verifier 120, the speaking target detector 130, the activation signal unit 140, the ASR engine 150, the assistant application 240, or any combination thereof. The device 500 may include a wireless controller 540 coupled, via a transceiver 550, to an antenna 552.

The device 500 may include a display 528 coupled to a display controller 526. The speaker 250 and the microphone 112 may be coupled to the CODEC 534. The CODEC 534 may include a digital-to-analog converter 502 and an analog-to-digital converter 504. In a particular implementation, the CODEC 534 may receive analog signals from the microphone 112, convert the analog signals to digital signals using the analog-to-digital converter 504, and provide the digital signals to the speech and music codec 508. The speech and music codec 508 may process the digital signals, and the digital signals may further be processed by the user voice verifier 120 and the speaking target detector 130. In a particular implementation, the speech and music codec 508 may provide digital signals to the CODEC 534. The CODEC 534 may convert the digital signals to analog signals using the digital-to-analog converter 502 and may provide the analog signals to the speakers 250.

In a particular implementation, the device 500 may be included in a system-in-package or system-on-chip device 522. In a particular implementation, the memory 586, the processor 506, the processors 510, the display controller 526, the CODEC 534, and the wireless controller 540 are included in a system-in-package or system-on-chip device 522. In a particular implementation, an input device 530 and a power supply 544 are coupled to the system-on-chip device 522. Moreover, in a particular implementation, as illustrated in FIG. 5, the display 528, the input device 530, the speaker 250, the microphone 112, the antenna 552, and the power supply 544 are external to the system-on-chip device 522. In a particular implementation, each of the display 528, the input device 530, the speaker 250, the microphone 112, the antenna 552, and the power supply 544 may be coupled to a component of the system-on-chip device 522, such as an interface or a controller.

The device 500 may include a smart speaker (e.g., the processor 506 may execute the instructions 556 to run the voice-controlled digital assistant application 240), a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In conjunction with the described implementations, an apparatus to process an audio signal representing input sound includes means for generating a first indication based on whether the audio signal represents a user's voice. For example, the means for generating the first indication can correspond to the user voice verifier 120, the processor 506, the one or more processors 510, one or more other circuits or components configured to generate a first indication based on whether the audio signal represents a user's voice, or any combination thereof.

The apparatus also includes means for generating a second indication based on whether the audio signal represents at least one of a command or a question. For example, the means for generating the second indication can correspond to the speaking target detector 130, the processor 506, the one or more processors 510, one or more other circuits or components configured to generate the second indication based on whether the audio signal represents at least one of a command or a question, or any combination thereof.

In some implementations, a non-transitory computer-readable medium (e.g., the memory 586) includes instructions (e.g., the instructions 556) that, when executed by one or more processors (e.g., the one or more processors 510 or the processor 506), cause the one or more processors to perform operations for processing an audio signal representing input sound. The operations include generating, at the one or more processors, a first indication based on whether the audio signal represents a user's voice, such as the first indication 122; generating, at the one or more processors, a second indication based on whether the audio signal represents at least one of a command or a question, such as the second indication 124; and selectively generating, at the one or more processors, an activation signal, such as the activation signal 142, based on the first indication and the second indication to selectively activate an automatic speech recognition engine to process the audio signal.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to process an audio signal representing input sound, the device comprising:
    a user voice verifier configured to generate a first indication based on whether the audio signal represents a user's voice;
    a speaking target detector configured to generate a second indication based on whether the audio signal represents at least one of a command or a question;
    an activation signal unit configured to selectively generate an activation signal based on the first indication and the second indication; and
    an automatic speech recognition engine configured to be activated, responsive to the activation signal, to process the audio signal.

2. The device of claim 1, wherein the user voice verifier, the speaking target detector, and the activation signal unit are included in an always-on pre-stage of a speech recognition system, and wherein the automatic speech recognition engine is included in an on-demand main stage of the speech recognition system.

3. The device of claim 1, wherein the activation signal unit is further configured to:
    select to generate the activation signal responsive to the first indication indicating that the audio signal represents a registered user's voice and the second indication indicating that the audio signal indicates a command or a question; and
    select to not generate the activation signal responsive to the first indication indicating that the audio signal does not represent a verified user or the second indication indicating that the audio signal does not indicate a command or a question.

4. The device of claim 1, wherein the first indication has a first value that indicates a first likelihood that the audio signal represents a user's voice and the second indication has a second value that indicates a second likelihood that the audio signal represents at least one of a command or a question.

5. The device of claim 4, wherein the activation signal unit is configured to determine whether to generate the activation signal based on whether a weighted sum of the first value and the second value satisfies a threshold.

6. The device of claim 1, further comprising a voice data storage configured to store voice characteristic data of one or more registered users, wherein the user voice verifier is configured to access the voice characteristic data to determine whether the audio signal represents the voice of one of the registered users, and wherein the speaking target detector is configured to access the voice characteristic data to determine whether the audio signal represents a command or question of one of the registered users.

7. The device of claim 1, wherein the speaking target detector is configured to determine whether the audio signal represents a command or question based on a user-independent voice model.

8. The device of claim 1, wherein the user voice verifier, the speaking target detector, the activation signal unit, and the automatic speech recognition engine are implemented in a wireless speaker and voice command device with an integrated assistant application.

9. The device of claim 1, wherein the user voice verifier, the speaking target detector, the activation signal unit, and the automatic speech recognition engine are implemented in a portable electronic device.

10. The device of claim 1, wherein the second indication identifies the audio signal as a question.

11. The device of claim 1, wherein the second indication identifies the audio signal as a command.

12. A method of processing an audio signal representing input sound, the method comprising:
    generating, at an electronic device, a first indication based on whether the audio signal represents a user's voice;
    generating, at the electronic device, a second indication based on whether the audio signal represents at least one of a command or a question; and
    selectively generating, at the electronic device, an activation signal based on the first indication and the second indication to selectively activate an automatic speech recognition engine to process the audio signal.

13. The method of claim 12, wherein the first indication, the second indication, and the activation signal are generated at an always-on pre-stage of a speech recognition system, and wherein the automatic speech recognition engine is included in an on-demand main stage of the speech recognition system.

14. The method of claim 12, wherein selectively generating the activation signal includes selecting to generate the activation signal responsive to the first indication indicating that the audio signal represents a registered user's voice and the second indication indicating that the audio signal indicates a command or a question.

15. The method of claim 12, wherein selectively generating the activation signal includes selecting to not generate the activation signal responsive to the first indication indicating that the audio signal does not represents a verified user or the second indication does not indicate that the audio signal indicates a command or a question.

16. The method of claim 12, wherein the first indication has a first value that indicates a first likelihood that the audio signal represents a user's voice and the second indication has a second value that indicates a second likelihood that the audio signal represents at least one of a command or a question.

17. The method of claim 16, wherein the activation signal is generated based on whether a weighted sum of the first value and the second value satisfies a threshold.

18. The method of claim 12, further comprising accessing voice characteristic data to determine whether the audio signal represents the voice of a registered user and to determine whether the audio signal represents a command or question of a registered user.

19. The method of claim 12, further comprising determining whether the audio signal represents a command or question based on a user-independent voice model.

20. A non-transitory computer-readable medium comprising instructions that, when executed by one or more processors of a device, cause the one or more processors to perform operations for processing an audio signal representing input sound, the operations comprising:
generating, at the one or more processors, a first indication based on whether the audio signal represents a user's voice;
generating, at the one or more processors, a second indication based on whether the audio signal represents at least one of a command or a question; and
selectively generating, at the one or more processors, an activation signal based on the first indication and the second indication to selectively activate an automatic speech recognition engine to process the audio signal.

21. The non-transitory computer-readable medium of claim 20, wherein selectively generating the activation signal includes selecting to generate the activation signal responsive to the first indication indicating that the audio signal represents a registered user's voice and the second indication indicating that the audio signal indicates a command or a question.

22. The non-transitory computer-readable medium of claim 20, wherein the first indication has a first value that indicates a first likelihood that the audio signal represents a user's voice and the second indication has a second value that indicates a second likelihood that the audio signal represents at least one of a command or a question.

23. The non-transitory computer-readable medium of claim 22, wherein the activation signal is generated based on whether a weighted sum of the first value and the second value satisfies a threshold.

24. The non-transitory computer-readable medium of claim 20, the operations further comprising accessing voice characteristic data to determine whether the audio signal represents the voice of a registered user and to determine whether the audio signal represents a command or question of a registered user.

25. The non-transitory computer-readable medium of claim 20, the operations further comprising determining whether the audio signal represents a command or question based on a user-independent voice model.

26. An apparatus to process an audio signal representing input sound, the apparatus comprising:
means for generating a first indication based on whether the audio signal represents a user's voice;
means for generating a second indication based on whether the audio signal represents at least one of a command or a question;
means for selectively generating an activation signal based on the first indication and the second indication; and
means for performing automatic speech recognition on the audio signal, the means for performing automatic speech recognition configured to be activated responsive to the activation signal.

27. The apparatus of claim 26, further comprising means for storing voice characteristic data of one or more registered users, wherein the means for generating the first indication is configured to access the voice characteristic data to determine whether the audio signal represents the voice of one of the registered users, and wherein the means for generating the second indication is configured to access the voice characteristic data to determine whether the audio signal represents a command or question of one of the registered users.

28. The apparatus of claim 26, wherein the means for generating the second indication is configured to determine whether the audio signal represents a command or question based on a user-independent voice model.

29. The apparatus of claim 26, wherein the means for generating the first indication, the means for generating the second indication, the means for selectively generating the activation signal, and the means for performing automatic speech recognition are implemented in a wireless speaker and voice command device with an integrated assistant application.

30. The apparatus of claim 26, wherein the means for generating the first indication, the means for generating the second indication, the means for selectively generating the activation signal, and the means for performing automatic speech recognition are implemented in a portable electronic device.

* * * * *